(12) United States Patent
Cornet et al.

(10) Patent No.: US 7,254,112 B2
(45) Date of Patent: Aug. 7, 2007

(54) SYSTEM AND METHOD FOR REASSEMBLING PACKETS IN A NETWORK ELEMENT

(75) Inventors: Jerome Cornet, Ottawa (CA); John C. Fischer, Stittsville (CA); Jason Sterne, Ottawa (CA); Peter Donovan, Orleans (CA)

(73) Assignee: Alcatel Canada Inc., Kanata (CA)

( * ) Notice: Subject to any disclaimer, the term of this patent is extended or adjusted under 35 U.S.C. 154(b) by 1092 days.

(21) Appl. No.: 10/294,630

(22) Filed: Nov. 15, 2002

(65) Prior Publication Data
US 2003/0137936 A1 Jul. 24, 2003

(30) Foreign Application Priority Data
Jan. 24, 2002 (CA) .................................. 2369432

(51) Int. Cl.
H04L 12/28 (2006.01)
H04L 12/66 (2006.01)
H04J 1/16 (2006.01)
H04J 3/22 (2006.01)
H04J 3/24 (2006.01)

(52) U.S. Cl. ...................... 370/230; 370/235; 370/356; 370/395.41; 370/412; 370/470; 370/474

(58) Field of Classification Search ................... None
See application file for complete search history.

(56) References Cited

U.S. PATENT DOCUMENTS 5,497,371 A       3/1996   Ellis et al.
5,959,993 A *     9/1999   Varma et al. ................ 370/397
6,188,698 B1 *    2/2001   Galand et al. .............. 370/412
6,819,658 B1 *   11/2004   Agarwal et al. ............ 370/316
6,826,147 B1 *   11/2004   Nandy et al. ............... 370/229
6,847,613 B2 *    1/2005   Mimura et al. ............. 370/235
7,002,916 B2 *    2/2006   Parruck et al. ............. 370/235
7,006,438 B2 *    2/2006   West et al. .................. 370/231
7,035,212 B1 *    4/2006   Mittal et al. ................ 370/230
7,120,113 B1 *   10/2006   Zhang et al. ............... 370/229
2002/0131413 A1 * 9/2002   Tsao et al. .................. 370/392

FOREIGN PATENT DOCUMENTS

EP    1 137 227    9/2001
EP    1 175 046    1/2002

* cited by examiner

*Primary Examiner*—Chi Pham
*Assistant Examiner*—Melanie Jagannathan
(74) *Attorney, Agent, or Firm*—McCarthy Tetrault LLP

(57) ABSTRACT

A method and apparatus for sending packets from traffic flows to queues in a network element is provided. Each traffic flow has a packet size parameter indicating a sizing constraint for its packets. The method includes the step of grouping the traffic flows into groups utilizing the packet size parameter of each traffic flow. The method further includes the step of sending packets only from traffic flows of one group to at least one designated queue. Traffic flows of the one group are identified utilizing the packet size parameter of each traffic flow.

20 Claims, 9 Drawing Sheets

SYSTEM AND METHOD FOR REASSEMBLING PACKETS IN A NETWORK ELEMENT

FIELD OF THE INVENTION

The invention relates to a system and method for reassembling packets in a network element, more specifically by segregating traffic flows based on their packet size.

BACKGROUND OF INVENTION

In a communications network, network elements such as switches and routers route data from traffic flows to their destinations. Inside a network element, traffic is segmented into fixed-length cells. Traffic flows are comprised of packets, with each packet comprising one or more cells after this "segmentation" stage. Each cell is processed independently from an ingress point through a switching fabric to an egress point. Such network elements may route or switch traffic from both single-cell packet traffic flows and variable-size packet traffic flows. Upon reaching an egress card of the network element on a frame-based interface, the cells of a variable-size packet are reassembled into packets, queued and transmitted from the network element. Generally, traffic flows can contain packets of any size, where packets require a varying number of cells to represent them. Some traffic flows may not contain random packet sizes. One such flow, denoted a single-cell packet traffic flow, contains only packets that can be represented by one cell. A single-cell packet traffic flow is similarly reassembled into packets, queued and transmitted from the network element.

As network elements are required to route and switch data from an increasing number of traffic flows, a network element may reuse reassembly queues for more than one traffic flow to reduce the hardware resources required to service all of the traffic flows. If reassembly queues are not shared, a large number of reassembly queues are required, one to service each traffic flow. A reassembly queue must wait for all cells of a packet to be reassembled before queuing and transmitting the frame from the network element. If traffic flows containing relatively small packets and traffic flows with relatively larger packets share a reassembly queue, the smaller packets may be queued behind larger packets being reassembled into frames. This may cause delays to the traffic flow containing the small packets.

There is a need for a system and method for reassembling packets in a network element that reduces the resources required to reassemble packets and enable efficient processing of certain traffic flows.

SUMMARY OF INVENTION

In a first aspect, a method of sending packets from traffic flows to queues in a network element is provided. Each traffic flow has a packet size parameter indicating a sizing constraint for its packets. The method includes the step of grouping the traffic flows into groups utilizing the packet size parameter of each traffic flow. The method further includes the step of sending packets only from traffic flows of one group to at least one designated queue. Traffic flows of the one group are identified utilizing the packet size parameter of each traffic flow.

The sizing constraint of the packet size parameter for the one group may indicate an upper bound for a packet size for the packets of the traffic flows belonging to the one group.

The designated queues may be selected by the network element prior to sending the packets from the traffic flows of the one group to the designated queues.

The at least one designated queue may be a plurality of designated queues.

The step of sending packets only from traffic flows of one group to at least one designated queue may be performed by, for each packet of each traffic flow of the one group, assigning a designated queue utilizing a queue assignment scheme and sending the each packet to the designated queue assigned.

The queue assignment scheme may assign the plurality of designated queues on a round robin basis.

Each of the packets from the plurality of traffic flows may have at least one data part.

The traffic flows of the one group may be single-cell packet traffic flows, each of the at least one data part may be one fixed length cell and the upper bound for the packet size of the packets of the traffic flows of the one group may be a size of one the fixed length cell.

The queues may be reassembly queues, each traffic flow being sent to the reassembly queues prior to reassembly into frames for transmission by the network element to an egress frame interface.

The step of sending packets only from the traffic flows of the one group to the designated queues may reuse the designated queues to concentrate packets of the traffic flows belonging to the one group onto the designated queues.

In a second aspect, a queuing apparatus for sending packets from traffic flows to queues in a network element is provided. Each traffic flow of the plurality of traffic flows has a packet size parameter indicating a sizing constraint for its the packets. The apparatus includes a classification module grouping the plurality of traffic flows into a groups utilizing the packet size parameter of the each traffic flow. The apparatus further includes a transmission module sending packets only from traffic flows of one group to at least one designated queue. The traffic flows of the one group are identified utilizing the packet size parameter of each traffic flow.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1:
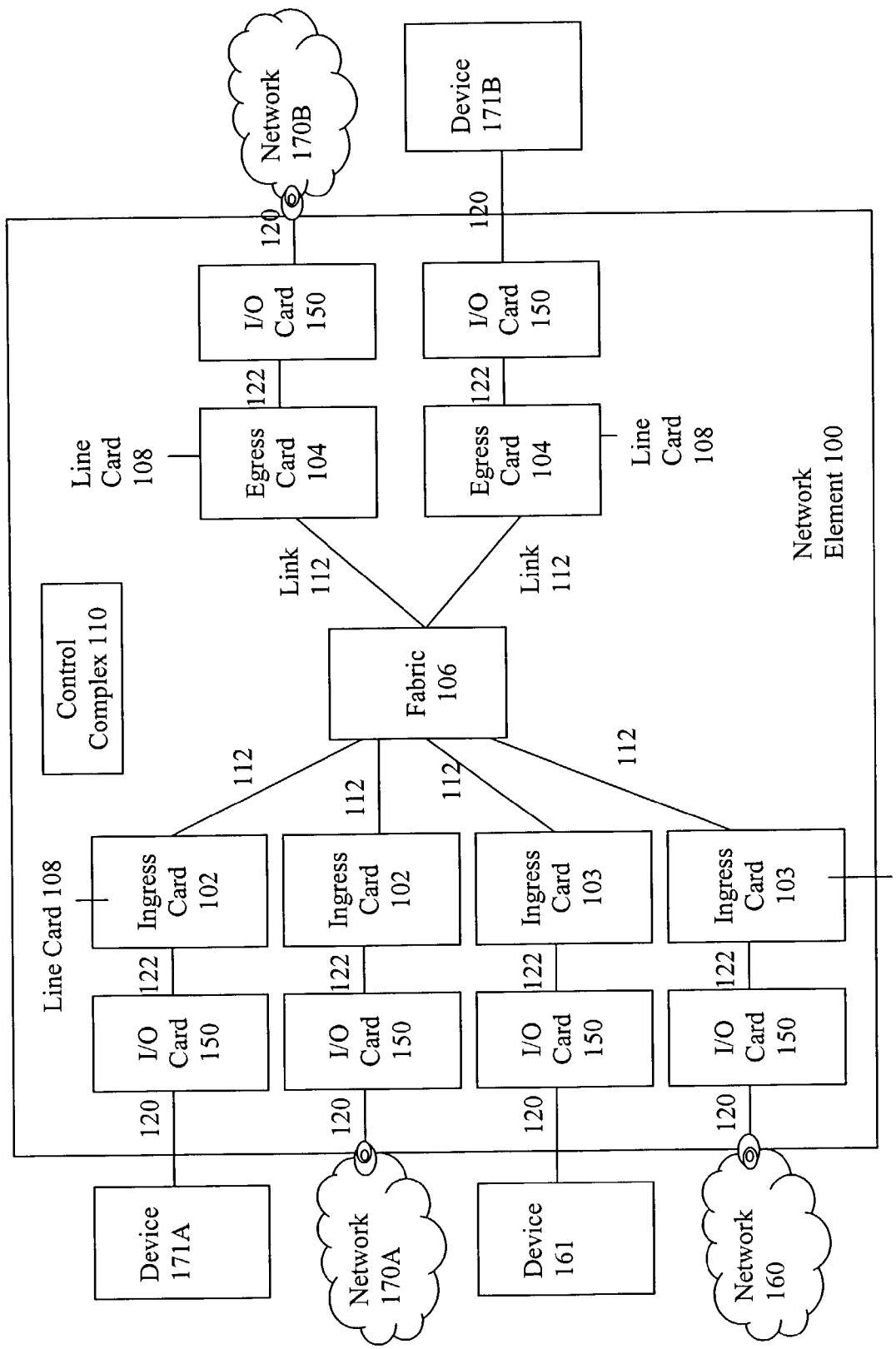
FIG. 1 is a block diagram of components of a network element connected to devices and networks, the network element comprising ingress cards, a switching fabric, egress cards and a control complex, the network element associated with an embodiment of the invention.

The description that follows, and the embodiments described therein, are provided by way of illustration of an example, or examples, of particular embodiments of the principles of the present invention. These examples are provided for the purposes of explanation, and not limitation, of those principles and of the invention. In the description that follows, like parts are marked throughout the specification and the drawings with the same respective reference numerals.

First, a description of a network element associated with the embodiment of the invention receiving traffic flows is provided, followed by a description of cells and frames of those traffic flows processed by the network element. This is followed by a description of reassembling packets in reassembly queues in the egress card of the network element prior to queuing and transmitting. Then, a description of establishing connections in the network element associated with the embodiment. Finally, an example of reassembling packets in appropriate reassembly queues in the network element associated with another embodiment is provided.

Accordingly, referring to FIG. 1, network element 100 is shown. Network element 100 comprises a plurality of line cards 108 (ingress cards 102 and 103 and egress cards 104), a plurality of input/output (I/O) cards 150, switching or routing fabric 106, a control complex 110 and links 112.

Network element 100 connects devices 161, 171A and 171B such as customer premise equipment (CPE), allowing them to transmit and receive traffic flows of data to a network 160, 170A or 170B, thereby acting as a switch and providing a connection point for devices 161 or 171 to a network 160 or 170. It will be appreciated that network element 100 may act as a router between networks 160, 170A and 170B similarly providing routing for traffic flows. Network element 100 may provide switching or routing for many (e.g. 128,000) traffic flows from each connected device 161 or 171 or network 160 or 170. It will be appreciated that terms such as "routing switch", "communication switch", "communication device", "switch", "router", "forwarding device" and other terms known in the art may be used to describe network element 100. In the embodiment, the network element 100 processes traffic on links 112 and fabric 106 as ATM-like cells. It will be appreciated that in other embodiments, other data formats may be processed. Line cards 108 provide the interface to different types of networks, some "cell-based" as the line card 103 and some "frame-based" as the line card 102.

Figure 2:
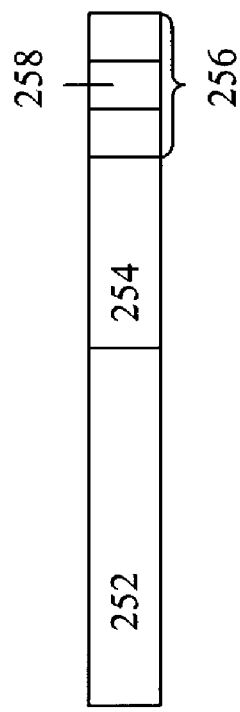
FIG. 2 is a block diagram a fixed length cell, a variable length frame and an internal cell processed by the network element of FIG. 1.

In a cell-based network 160, the information is transported on the links 120 using fixed-size transport units known as cells (ATM is one example of such a network). However, in a frame-based network (170A and 170B), the information is transported on the links using variable-size transport units known as frames (Frame Relay is one example of a frame-based network). Both types of networks 160 and 170 can transmit data of any size (known as packet) using the process described hereafter:

In the case of frame-based networks 170, referring to FIG. 2, a frame 260, as known in the art, is variable in length and comprises a frame payload 262 also referred to as packet, frame header 264, beginning of frame marker 266 and end of frame marker 268.

For cell-based networks, the packet is segmented into multiple data parts that are fixed size cell payloads 272; each cell payload 272 is transmitted along with a cell header 274 on the links. The process for converting a packet into multiple cells is known in the art as AAL5 processing. An ATM cell 270, as known in the art, comprises 48 bytes of data in cell payload 272 and 5 bytes of header information in cell header 274.

Referring again to FIG. 1, traffic flows arrive from devices 161 and 171 or networks 160 and 170 at I/O cards 150 of network element 100 over links 120. I/O cards 150 provide input and output processing of traffic flows for network element 100, allowing connection of devices 161 and 171 and networks 160 and 170 to network element 100.

Packets from variable-size packet traffic flows and single-cell packet traffic flows are processed by I/O cards 150 and transmitted to a line card 108 over link 122. Line cards 108 perform shaping of traffic flows received from I/O cards 150 before forwarding the traffic flow to the fabric 106. Line cards 108 are ingress cards 102 and 103 and egress cards 104. An ingress card 102 or 103 provides ingress processing for a traffic flow entering network element 100. An egress card 104 provides egress processing for a traffic flow exiting network element 100. It will be appreciated that a line card 108 may be both an ingress card 102 and an egress card 104 if it provides both ingress processing and egress processing in network element 100.

Ingress card 103 provides ingress processing for cells 270, and ingress card 102 provides ingress processing for frames 260; although a logical separation is made between those two cards 102 and 103, they can be combined on the same physical card. Each is discussed below in turn.

Ingress card 102 processes frames 260 by segmenting them into internal cells 250 for internal switching or routing in network element 100. The processing of frames 260 is achieved by a module in ingress card 102 which is adapted to read the contents of received frames 260, extract information from the frame headers 264, read the frame payloads (the packets) 262 and segment them accordingly. Referring to FIG. 2A, an internal cell 250 is shown having a cell payload 252, and an internal cell header 256 having a connection identifier (CI) field 258. Ingress card 102 removes the beginning of frame marker 266 and end of frame marker 268 of frame 260. Ingress card 102 segments frame payload 262 of frame 260 and forms it into cell payloads 252 of internal cells 250. Frame header 264 is used to create cell headers 254 for internal cells 250 in the packet and is placed inside cell payload 252 of the first internal cell 250 of the packet. Ingress card 102 adds an additional internal header 256 to each internal cell 250 to provide addressing information for each internal cell 250 as it traverses network element 100.

The context label or address of frame 260 identifying the traffic flow is contained in frame header 264. Ingress card 102 uses the context label or address to identify the connection identifier (CI) for frame 260. The CI value of an internal cell 250 indicates information concerning the associated traffic flow used on initiation of the datapath connection to define how a traffic flow will be processed by network element 100. Ingress card 102 inserts the value of the CI into CI field 258 in internal header 256 of internal cell 250. Further detail on aspects of the CI and initiation of the datapath connection are provided later.

Ingress card 103 (Cell Relay card) processes cells 270 by mapping cell payload 272 to cell payload 252 of internal cell 250, cell header 274 to cell header 254 and by providing an additional internal header 256 to provide addressing information for each internal cell 250 as it traverses network element 100. The context label or address of cell 270 identifying the traffic flow is contained in cell header 274. Ingress card 103, similar to processing of frames 260, uses the context label or address to identify the CI value for cell 270 and inserts this value into CI field 258 in internal header 256 of internal cell 250.

Referring again to FIG. 1, ingress cards 102 and 103 have a datapath connection to fabric 106 for traffic flows entering network element 100 at their connected I/O cards 150. Traffic flows are transmitted from an ingress card 102 or 103 to fabric 106 over a link 112. Fabric 106 provides cell switching or routing capacity for network element 100. Fabric 106 routes the traffic flow from ingress card 102 to the appropriate egress card 104 over another link 112 as per the routing information in internal header 256 of internal-cells 250 of the traffic flow.

Traffic flows transiting through the fabric 106 may be variable-size packet traffic flows or single-cell-packet traffic flows. Variable-size packet traffic flows contain packets originally transmitted on the network 170A as a variable length frames 260 or on the network 160A as one or more fixed length cells 270. Single-cell packet traffic flows contain packets, which, in the embodiment, comprise one cell 250 when transmitted in the fabric 106. Single-cell packet traffic flows include traffic flows from network 160 if each internal cell 250 is treated independently in network element 100 and other traffic flows from network 170A comprising frames of known length which would be transmitted in fabric 106 as one internal cell 250.

Traffic received at egress card 104 is processed for transmission from network element 100 to the device 160 or network 170 associated with egress card 104. It will be appreciated that egress card 104 may receive traffic from a plurality of ingress cards 102 or 103 through fabric 106. Egress card 104 in network element 100 may use a frame interface to transmit frames 260 from egress card 104 to an I/O card 150 and into a connected device 160 or network 170. In this situation, egress card 104 reassembles internal cells 250 into frames 260 for transmission from egress card 104. Reassembly into a frame 260 occurs only when the egress interface is a frame interface. Other egress interfaces (not shown) may operate on a cell basis (such as an ATM interface) and no reassembly into a frame 260 is required.

Briefly, an egress line card 104 in a network element of an embodiment reassembles internal cells 250 from single-cell packet traffic flows and variable-size packet traffic flows in egress card 104 of the network element 100 prior to queuing complete packets for transmission over a frame interface. Egress card 104 sends single-cell packet traffic flows to a designated single-cell packet reassembly queue, the single-cell packet reassembly queue being a separate reassembly queue from those for queuing packets from variable-size packet traffic flows. This provides reuse of the single-cell packet reassembly queue reducing the resources required by concentrating traffic from the single-cell packet traffic flows onto one single-cell packet reassembly queue. It also provides separation of single-cell packet traffic flows from variable-size packet traffic flows for reassembly. There may be more than one single-cell packet reassembly queue used to reassemble packets from single-cell packet traffic flows. The reassembly queue designated may be used to reassemble not only single-cell packet traffic flows but also any variable-size packet traffic flows where the packets to be reassembled are relatively small compared to packets of other variable-size packet traffic flows.

Figure 3:
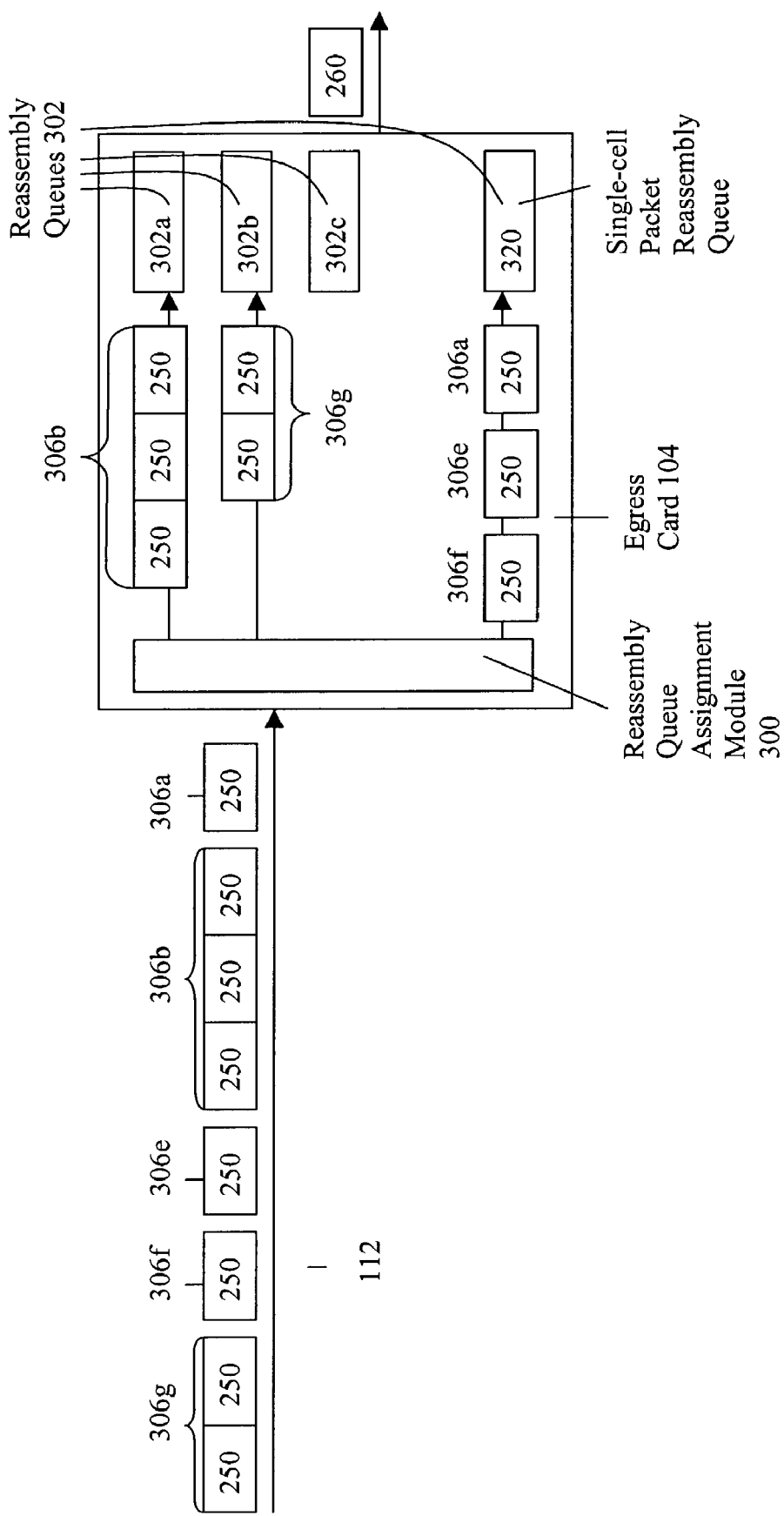
FIG. 3 is a block diagram of traffic flowing through an egress card of the network element of FIG. 1.

Referring to FIG. 3, a description of reassembling internal cells 250 of packets 306 into frames 260 in egress card 104 of network element 100 is provided. Egress card 104 comprises a reassembly queue assignment module 300 and a plurality of reassembly queues 302, one of which is a single-cell packet reassembly queue 320.

Egress card 104 reassembles single-cell packet traffic flows in a designated single-cell packet reassembly queue 320 separate from variable-sized packet reassembly queues 302 for reassembling variable-size packet traffic flows. This provides reuse of single-cell packet reassembly queue 320 reducing the reassembly resources required in egress card 104. In the embodiment, the reassembly resources are hardware based. Also, if single-cell packet traffic flows and variable-size packet traffic flows share a reassembly queue 302, a packet 306 from a single-cell packet traffic flow may be queued behind a large packet 306 from a variable-size packet traffic flow which may delay reassembly into a frame 260. Using a designated single-cell packet reassembly queue 320 in the embodiment separates queuing of single-cell packet traffic flows from variable-size packet traffic flows.

Internal cells 250 from single-cell packet traffic flows and variable-size packet traffic flows arrive at reassembly queue assignment module 300 of egress card 104 on link 112. FIG. 3 shows packet 306*b*, having internal cells 250*b*, 250*c* and 250*d*, and packet 306*g*, having internal cells 250*g* and 250*h* from variable-size packet traffic flows arriving at egress card 104. FIG. 3 also shows packet 306*a*, having internal cell 250*a*, packet 306*e*, having internal cell 250*e*, and packet 306*f*, having internal cell 250*f*, from single-cell packet traffic flows arriving at egress card 104. Each internal cell 250 is then sent by a transmission module, the reassembly queue assignment module 300 to a reassembly queue 302 corresponding to its CI value contained in CI field 258 of cell header 256. Each internal cell 250 of a packet 306 is sent to the same reassembly queue 302. The reassembly queue to CI relationship is established on initiation of the datapath connection through network element 100. Further details on aspects of the CI and initiation of the datapath connection are provided later.

Once all internal cells 250 of a packet 306 are received in the packet's specified reassembly queue 302, egress card 104 removes internal headers 256 and cell headers 254 and maps the information contained in cell headers 254 into frame header 264. Egress card 104 reassembles cell payloads 252 into frame payload 262 and inserts a beginning of frame marker 266 and an end of frame marker 268 to delineate the beginning and end of frame 260, respectively. When packet 306 contains more than one internal cell 250, such as packets 306*b* and 360*g*, more than one cell payload 252 is reassembled into frame payload 262. When packet 306 contains a single internal cell 250, such as packets 306*a*, 306*e* and 306*f*, cell payload 252 is encapsulated into frame payload 262. Egress card 104 then transmits the reassembled frame 260 to its connected I/O card 150 and out of network element 100.

As noted previously, if internal cells 250 from a single-cell packet traffic flow are sent to the same reassembly queue 302 as internal cells 250 from a variable-size packet traffic flow, internal cells 250 from the single-cell packet traffic flow may be queued behind a large packet 306 from the variable-size packet traffic flow which may delay reassembly into frames 260. This occurs since all internal cells 250 of packet 306 must be received in reassembly queue 302 before egress card 104 can reassemble frame 260.

To avoid queuing internal cells 250 from a single-cell packet traffic flow behind large packets 306, reassembly queue assignment module 300 queues internal cells 250 from a single-cell packet traffic flow in a reassembly queue 302 designated to be a single-cell packet reassembly queue 320. Single-cell packet reassembly queue 320 only queues internal cells 250 from single-cell packet traffic flows so they are not queued behind packets 306 from variable-size packet traffic flows when reassembling frames 260. FIG. 3 shows that reassembly queue assignment module 300 has sent packet 306b from a variable-size packet traffic flow to reassembly queue 302a, packet 306g from a variable-size packet traffic flow to reassembly queue 302b and packets 306a, 204e and 204f from single-cell packet traffic flows to cell reassembly queue 320. It will be appreciated that, in other embodiments, more than one single-cell packet reassembly queue 320 may be used to queue internal cells 250 from single-cell packet traffic flows.

The following section describes mechanics of establishing connections for traffic flows in a network element 100 of the embodiment to process and direct internal cells 250 from those traffic flows using the embodiment.

Figure 4:
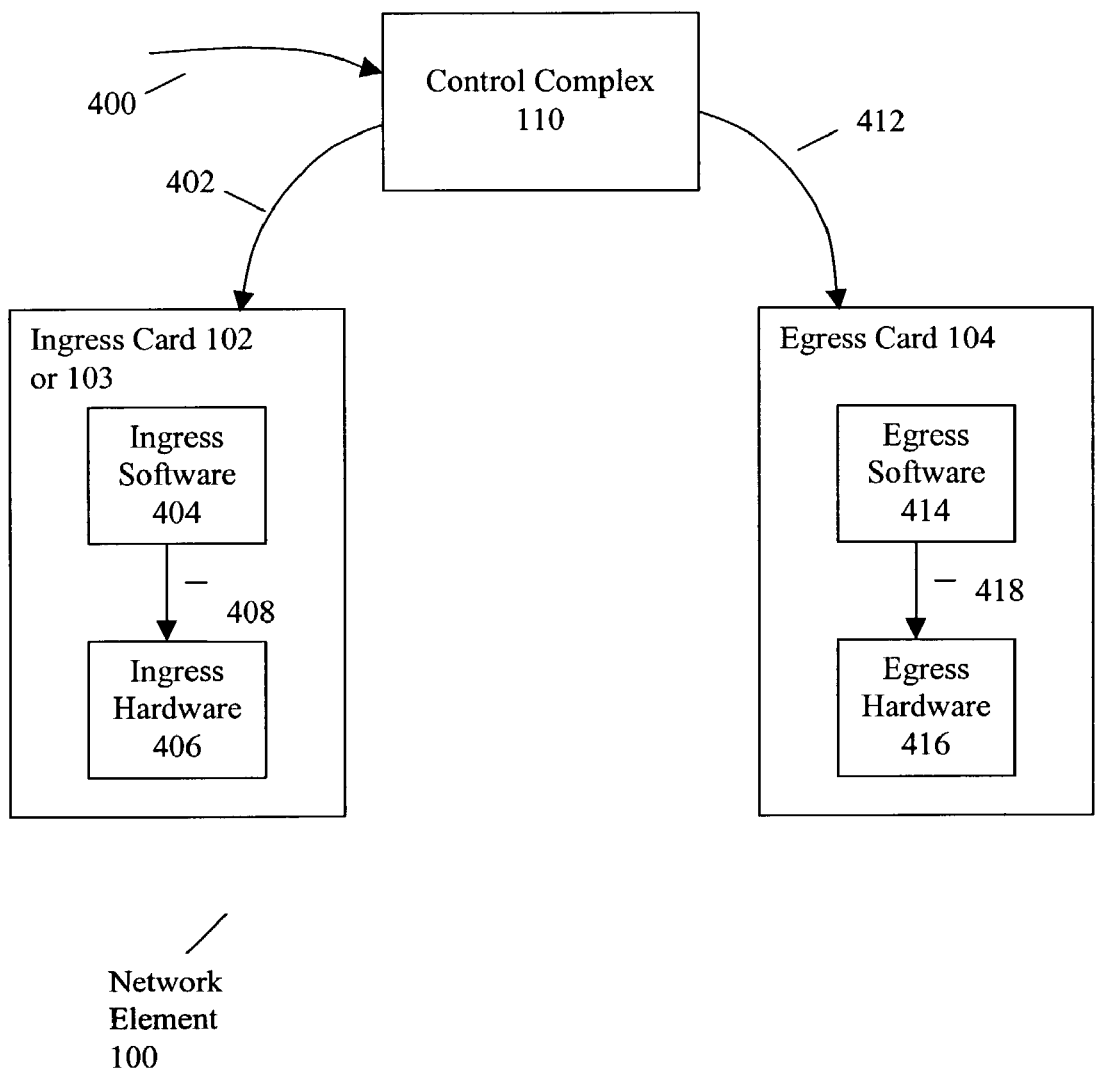
FIG. 4 is a block diagram of the control complex configuring datapath connections between an ingress card and an egress card in the network element of FIG. 1.

Referring to FIG. 4, an illustration of the interactions of control complex 110 with an ingress card 102 or 103 and egress card 104 when establishing connections is provided. Control complex 110 has hardware and software modules providing central management of switching, routing and operational aspects of network element 100 and its components.

Ingress card 102 or 103 of network element 100 has ingress software 404 and ingress hardware 406. Egress card 104 of network element 100 has egress software 414 and egress hardware 416. Egress hardware includes memory that is used for reassembly queues 302, including single-cell packet reassembly queue 320, and reassembly queue assignment module 300.

Control complex 110 establishes a connection for a traffic flow through network element 100 when it receives a message from another network element or device connected to network element 100, indicated by arrow 400, that a connection through network element 100 is desired for a traffic flow. The message may be signaled to network element 100 or be generated by an operator manually configuring the connection as is known in the art. To establish the connection, control complex 110 first assigns a CI value for this traffic flow and then sends an initialization message to ingress card 102 or 103 for the traffic flow, indicated by arrow 402. This message contains the identity of the egress card 104 and the newly assigned CI value. Information indexed by the CI value is used by the embodiment to track priority, queuing and other aspects of messages and their associated queues.

Ingress card 102 or 103 receives the initialization message which triggers ingress software 404 to allocate memory from ingress hardware 406, indicated by arrow 408, to define a queue to the traffic flow. Traffic flows are queued in these queues prior to being formed into internal cells 250.

Control complex 110 also sends a second initialization message to egress card 104, indicated by arrow 412, to establish the new connection for the traffic flow. This second initialization message contains the identity of the ingress card 102 or 103, whether the traffic flow is a variable-size packet traffic flow or single-cell packet traffic flow and the newly assigned CI value.

Egress software 414 determines if the traffic flow should be assigned a new reassembly queue 302 or share a previously assigned reassembly queue 302. Reassembly queue assignment module 300 is programmed with the CI value to reassembly queue relationship. The type of traffic flow, i.e. a single-cell packet traffic flow or a variable-size packet traffic flow, may be used by reassembly queue assignment module 300 to treat like traffic flows similarly, effectively grouping the traffic flows. The type of traffic flow acts as a packet size parameter and provides a sizing constraint for the packets 306 of the traffic flow. The upper bound for packets 306 of a single-cell packet traffic flow is the length of one internal cell 250. Single-cell packet traffic flows are assigned to be reassembled in the designated single-cell packet reassembly queue 320. It will be appreciated that an explicit packet size parameter may be provided on initiation of the datapath connection separate from the type of traffic flow as either a single-cell packet traffic flow or a variable-size packet traffic flow.

After the CI value is used to establish the route for all traffic associated with it, processing of cells associated by the CI value can be performed. Ingress card 102 or 103 receives packets 306 for variable-size packet traffic flows and single-cell packet traffic flows and forms one or more internal cells 250 from packet 306 as described earlier. Ingress card 102 inserts the CI value for the traffic flow into CI field 258 of each internal cell 250 of packet 306. Internal cells 250 are transmitted to the appropriate egress card 104. Egress card 104, upon receiving an internal cell 250, reads the CI value from CI field 258. Reassembly queue assignment module 300 in egress hardware 416 uses the CI value to send the internal cell 250 to a reassembly queue 302 based on the previously defined CI to reassembly queue relationship. Reassembly queue assignment module 300 sends internal cells 250 from single-cell packet traffic flows to single-cell packet reassembly queue 320.

It will be appreciated that there are a number of methods to map the CI value of an incoming internal cell 250 to the correct reassembly queue 302 in reassembly queue assignment module 300. One method is to mark the assigned reassembly queue 302 in a "queue" field in the internal header 256 of internal cell 250. Another method is to have a table in reassembly queue assignment module 300 which maps the associated cell reassembly queue 320 for the CI. Using this mapping scheme in embodiments with more than one single-cell packet reassembly queue 320 makes it possible to have a set of single-cell packet reassembly queues 320 being associated with a particular CI value such that internal cells 250 having the same CI value are queued in more than one single-cell packet reassembly queue 320. Members from the set of single-cell packet reassembly queues 320 may be assigned to receive internal cells 250 on a round-robin basis, or other assignment schemes known in the art. Thus the CI value to reassembly queue relationship defined when the datapath connection was made indicates that the assignment scheme is to be used to send the internal cell 250 to the appropriate single-cell packet reassembly queue 320.

Similar methods may be used to send internal cells 250 belonging to packets 306 from variable-size packet traffic flows to reassembly queues 302, however, the assignment scheme must send all internal cells 250 belonging to a packet 306 to the same reassembly queue 302 for it to be reassembled into a frame 260.

Referring to FIGS. 5A-E, in another embodiment, network element 100' uses four cell reassembly queues 320a, 320b, 320c and 320d to reassemble internal cells 250 from single-cell packet traffic flows assigned on a round-robin basis. FIGS. 5A-E illustrate an example of sending internal cells 250 from single-cell packet traffic flows to single-cell packet reassembly queues 320 in this embodiment of network element 100'.

Reassembly queue assignment module 300' is shown having connection identifier (CI) tables 500(1), 500(2) and 500(3) and first-in-first out (FIFO) list 502 of single-cell packet reassembly queues 320a, 320b, 320c and 320d. CI tables 500 are stored in reassembly queue assignment module 300' when the datapath connection is established. One CI table 500 is stored for each traffic flow, indexed by the CI value assigned to the traffic flow. Each CI table 500 contains a number of fields which contain information used by egress card 104' to properly process the traffic flow associated with the CI value. One such field is flag 504. Setting flag 504 in a CI table 500 indexed by a given CI value indicates that an internal cell 250 having that CI value in CI field 258 is to be queued in one of the four single-cell packet reassembly queues 320a, 320b, 320c and 320d.

FIFO list 502 has a top of list entry 506 indicating the next cell reassembly queue 320 in which to send cells 306 from single-cell packet traffic flows. When an internal cell 250 arrives at reassembly queue assignment module 300' with flag 504 in its CI table 500 set, reassembly queue assignment module 300' sends internal cell 250 to the next cell reassembly queue 320 on FIFO list 502. Top of list entry 506 is then removed and added to the bottom of FIFO list 502. Accordingly, subsequent internal cells 250 from single-cell packet traffic flows are queued sequentially in successive single-cell packet reassembly queues 320.

To illustrate further aspects of the reassembly mechanism, three single-cell packet traffic flows are illustrated as being processed by the embodiment. The three single-cell packet traffic flows, A, B and C of the example of FIGS. 5A-E have the assigned CI value and packets 306, where each packet 306 comprises an internal cell 250, as follows:

| Cell-mode Traffic Flow | Connection Identifier | Packets |
| --- | --- | --- |
| A | 1 | 306m, 306o |
| B | 2 | 306n, 306p |
| C | 3 | 306q |

Figure 5A:
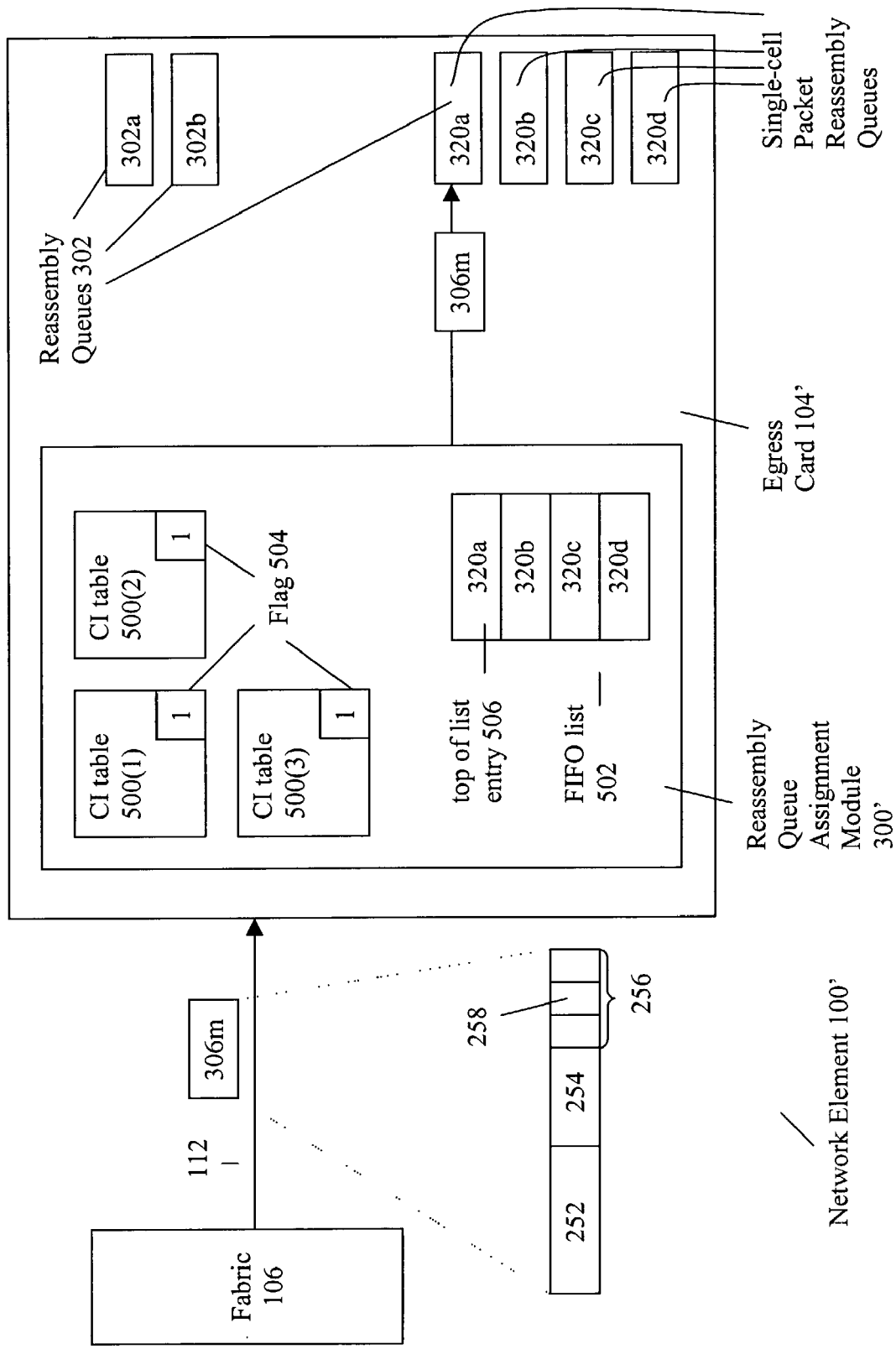
FIG. 5A is a block diagram illustrating queuing a first packet in reassembly queues of an egress card of a network element associated with another embodiment.

In FIG. 5A, first in the example, egress card 104' receives packet 306m at reassembly queue assignment module 300' from fabric 106 over link 112. Packet 306m comprises an internal cell 250 with CI field 258 within internal header 256. Reassembly queue assignment module 300' reads the value of the CI from CI field 258, CI value being "1" for this traffic flow, and refers to the appropriate CI table 500(1). Flag 504 in CI table 500(1) indicates that packet 306m is to be queued in one of single-cell packet reassembly queues 320. Reassembly queue assignment module 300' then accesses FIFO list 502 to identify which single-cell packet reassembly queue 320 is positioned at top of list entry 506. Top of list entry 506 contains the identity of single-cell packet reassembly queue 320a therefore reassembly queue assignment module 300' sends packet 306m to single-cell packet reassembly queue 320a. Reassembly queue assignment module 300' removes single-cell packet reassembly queue 320a from top of list entry 506 and adds it to the bottom of FIFO list 502.

Figure 5B:
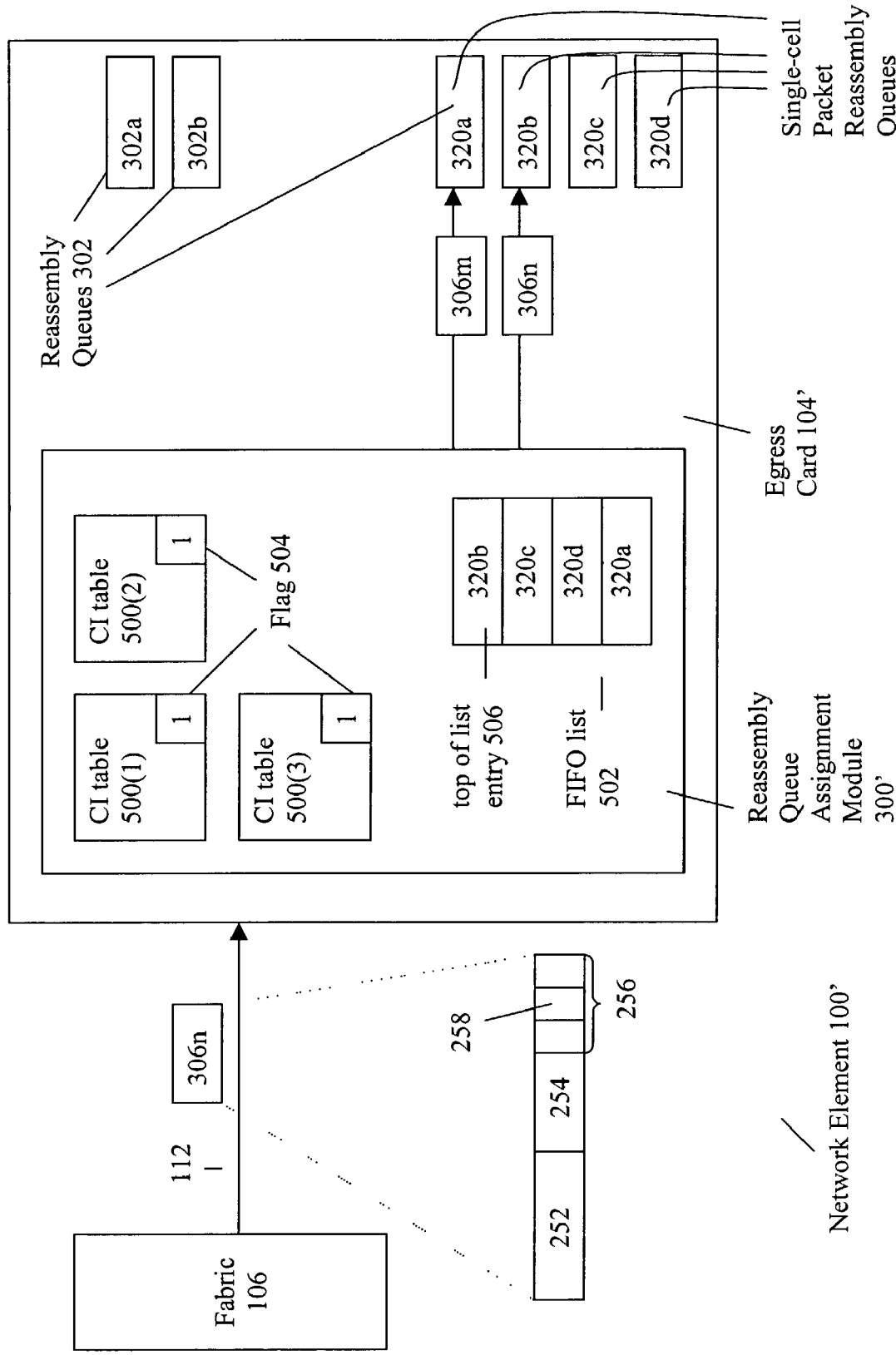
FIG. 5B is a block diagram illustrating queuing a second packet in reassembly queues of the egress card of the network element of FIG. 5A.

Referring to FIG. 5B, top of list entry 506 indicates the next cell reassembly queue 320 to be assigned is cell reassembly queue 320b. Egress card 104' receives packet 306n at reassembly queue assignment module 300' from fabric 106 over link 112. Reassembly queue assignment module 300' reads the CI value, "2", for packet 306n and consults the appropriate CI table 500(2). Flag 504 in CI table 500(2) indicates that packet 306n is to be sent to one of single-cell packet reassembly queues 320. Reassembly queue assignment module 300' then accesses FIFO list 502 to identify the next single-cell packet reassembly queue 320 to be used. Reassembly queue assignment module 300' queues packet 306n in single-cell packet reassembly queue 320b, the single-cell packet reassembly queue 320 in top of list entry 506. Reassembly queue assignment module 300' removes single-cell packet reassembly queue 320b from top of list entry 506 and adds it to the bottom of FIFO list 502.

Figure 5C:
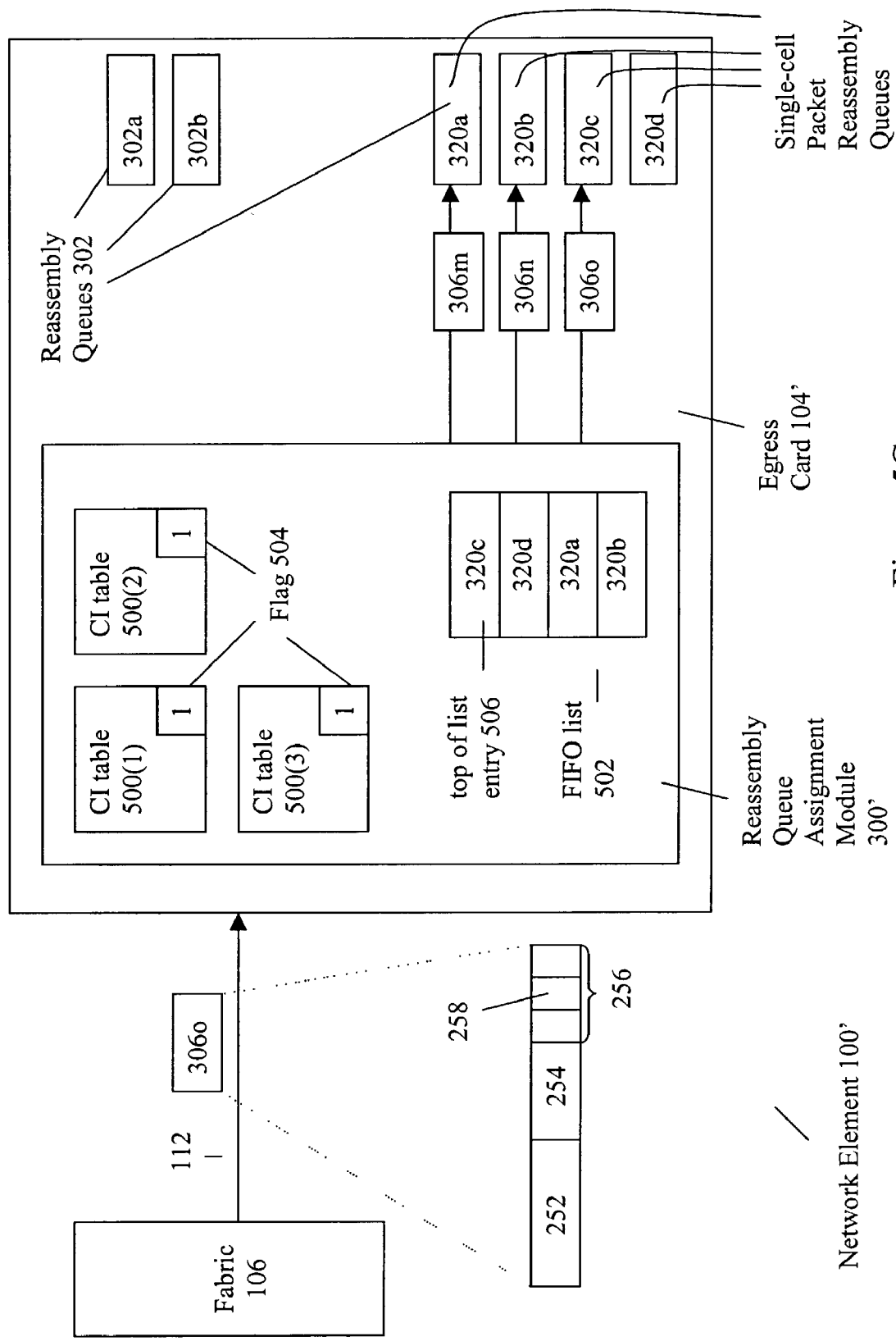
FIG. 5C is a block diagram illustrating queuing a third packet in reassembly queues of the egress card of the network element of FIG. 5A.

Referring to FIG. 5C, top of list entry 506 indicates the next cell reassembly queue 320 to be assigned is single-cell packet reassembly queue 320c. Egress card 104' receives packet 306o at reassembly queue assignment module 300' from fabric 106 over link 112. Reassembly queue assignment module 300' reads the CI value, "1", for packet 306o and consults the appropriate CI table 500(1). As before, flag 504 in CI table 500(1) indicates that packet 306o is to be queued in one of single-cell packet reassembly queues 320. Reassembly queue assignment module 300' then accesses FIFO list 502 to identify the next single-cell packet reassembly queue 320 to be used. Reassembly queue assignment module 300' sends packet 306o to single-cell packet reassembly queue 320c, the single-cell packet reassembly queue 320 in top of list entry 506. Note that packet 306m with the same CI value, "1", was sent to single-cell packet reassembly queue 320a. Reassembly queue assignment module 300' removes single-cell packet reassembly queue 320c from top of list entry 506 and adds it to the bottom of FIFO list 502.

Figure 5D:
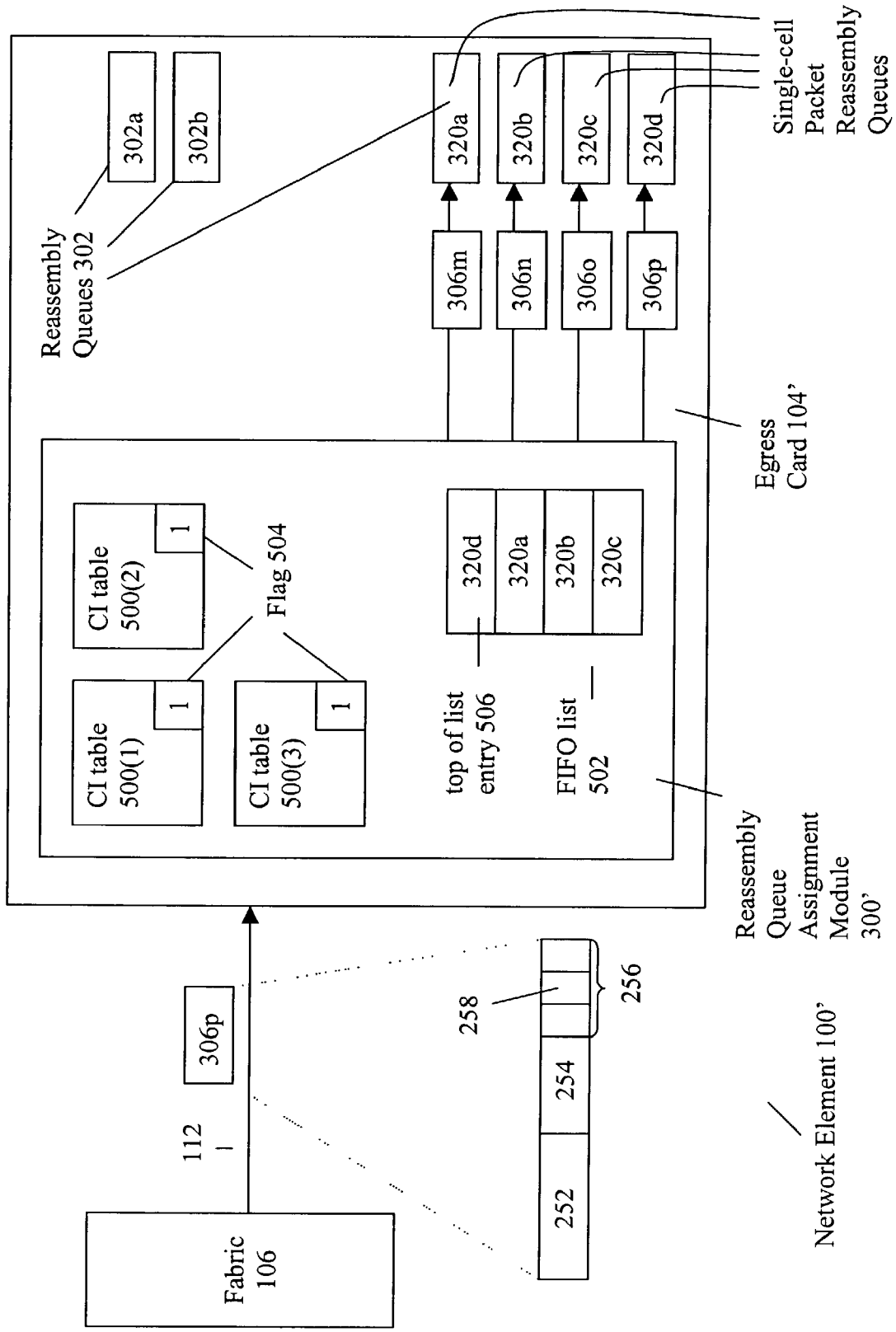
FIG. 5D is a block diagram illustrating queuing a fourth packet in reassembly queues of the egress card of the network element of FIG. 5A.

Referring to FIG. 5D, top of list entry 506 indicates the next single-cell packet reassembly queue 320 to be assigned is single-cell packet reassembly queue 320d. Egress card 104' receives packet 306p at reassembly queue assignment module 300' from fabric 106 over link 112. As with packet 306n, which had the same CI value as packet 306p, reassembly queue assignment module 300' sends packet 306p to the next single-cell packet reassembly queue 320 from FIFO list 502, single-cell packet reassembly queue 320d. Reassembly queue assignment module 300' removes single-cell packet reassembly queue 320d from top of list entry 506 and adds it to the bottom of FIFO list 502.

Figure 5E:
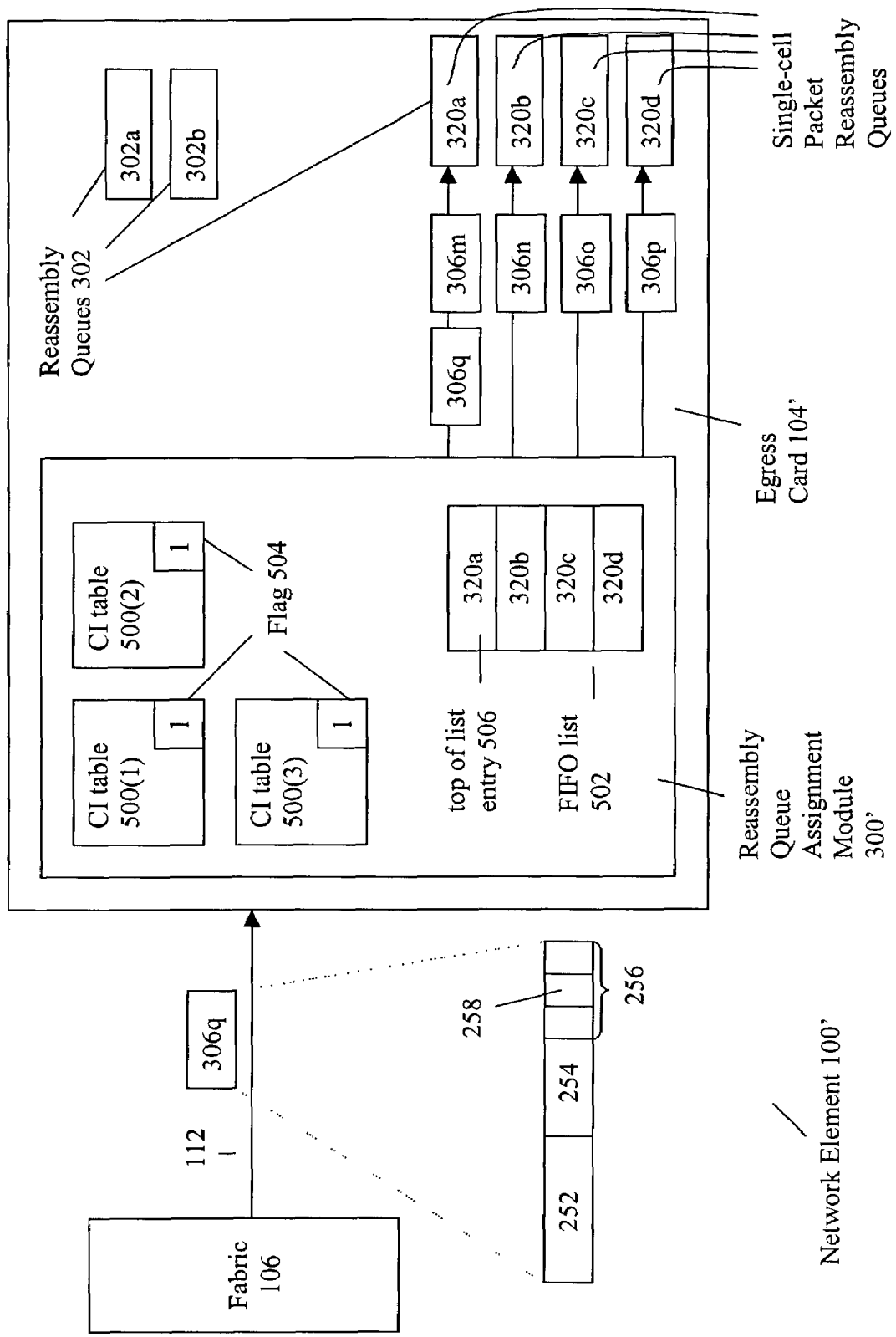
FIG. 5E is a block diagram illustrating queuing a fifth packet in reassembly queues of the egress card of the network element of FIG. 5A.

Referring to FIG. 5E, top of list entry 506 indicates the next single-cell packet reassembly queue 320 to be assigned is again single-cell packet reassembly queue 320a. Egress card 104' receives packet 306q at reassembly queue assignment module 300' from fabric 106 over link 112. Reassembly queue assignment module 300' reads the CI value, "3", for packet 306q and consults the appropriate CI table 500(3). Flag 504 in CI table 500(3) indicates that packet 306q is to be sent to one of single-cell packet reassembly queues 320. Reassembly queue assignment module 300' then accesses FIFO list 502 to identify the next single-cell packet reassembly queue 320 to be used. Reassembly queue assignment module 300' sends packet 306q to single-cell packet reassembly queue 320c, the single-cell packet reassembly queue 320 in top of list entry 506. Note that packet 306m with a different CI value, "1", was also sent to cell reassembly queue 320a. Reassembly queue assignment module 300' removes single-cell packet reassembly queue 320a from top of list entry 506 and adds it to the bottom of FIFO list 502.

Packets 306 from variable-size packet traffic flows arriving at reassembly queue assignment module 300' will be sent to reassembly queues 302 that are not single-cell packet reassembly queues 320. In the embodiment, each CI value associated with a variable-size packet traffic flow also has a CI table 500 stored in reassembly queue assignment module 300'. Flag 504 of its CI table 500 is not set, indicating to reassembly queue assignment module 300' to send packets 306 with this CI value to the reassembly queue 302 assigned when the datapath connection was established. The assigned reassembly queue 302 is stored in CI table 500.

After queuing packets 306 in reassembly queues 302, egress card 104' reassembles frames 260 from packets 306, queues them and transmits frames 260 from egress card 104', as described previously.

Egress cards 104 and 104' of network elements 100 and 100', respectively, are described as grouping traffic flows as variable-size packet traffic flows and single-cell packet traffic flows for sending to reassembly queues 302 and single-cell packet reassembly queues 320, respectively. It will be appreciated that, in an alternative embodiment, designated reassembly queues 302 may also be used to receive packets 306 of variable-size packet traffic flows with relatively small sized packets 306 compared to other traffic flows. In the previously described embodiments, the indication of the size of the packets 306 is given by whether the traffic flow is a single-cell packet traffic flow or a variable-size packet traffic flow. Single-cell packet traffic flows indicate that its packets 306 contain one internal cell 250. In this alternative embodiment, a packet size parameter of each traffic flow will indicate which traffic flows have small sized packets 306.

For example, a variable-size packet traffic flow A is known to have an upper bound on the size of its packets 306 of three internal cells 250 in each packet 306 while other variable-size packet traffic flows may have an upper bound of 20 internal cells 250 in each packet 306. Packets 306 from variable-size packet traffic flow A may be queued behind larger packets 306 from other variable-size packet traffic flows in the same manner as packets 306 from single-cell packet traffic flows. When establishing the datapath connection in network element 100 or network element 100', control complex 110 sends indication of the packet size parameter to egress card 104 or 104' that packets 306 in variable-size packet traffic flow A are relatively small. Reassembly queue assignment module 300 can then assign a reassembly queue 302 that has been designated for traffic flows with relatively small packets 306.

When reassembling packets 306 from both single-cell packet traffic flows and variable-size packet traffic flows in more than one reassembly queue 302, it will again be appreciated that there that there are a number of methods to map the CI value of an incoming internal cell 250 to the correct reassembly queue 302. A round-robin system as described in relation to FIGS. 5A-5E may be used to choose the reassembly queue 302 but it must ensure all internal cells 250 belonging to the same packet 306 from a variable-size packet traffic flow are sent to the same reassembly queue 302 for reassembly into frames 260.

In summary, an egress card reassembles single-cell packet traffic flows in designated single-cell packet reassembly queues prior to queuing frames for transmission over a frame interface. The single-cell packet reassembly queues are separate reassembly queues from those for queuing packets from variable-size packet traffic flows. This provides reuse of single-cell packet reassembly queues reducing the resources required to reassemble traffic flows by concentrating traffic from the single-cell packet traffic flows onto one single-cell packet reassembly queue. It also provides separation of single-cell packet traffic flows from variable-size packet traffic flows for reassembly. The reassembly queues designated may be used to reassemble not only single-cell packet traffic flows but also any variable-size packet traffic flows where the packets to be reassembled are relatively small compared to packets of other variable-size packet traffic flows.

It is noted that those skilled in the art will appreciate that various modifications of detail may be made to the present embodiment, all of which would come within the scope of the invention.

We claim:

1. A method for allocating reassembly queues at an egress of a network element to traffic flows received at an ingress to said network element, each traffic flow having a respective packet size parameter for indicating whether said each traffic flow is a single-cell packet traffic flow having single-cell packets or a variable-size packet traffic flow having variable-size packets, each of said single-cell packets being associated with a single internal cell within said network element and each of said variable-size packets being associated with a variable number of internal cells within said network element, said method comprising the steps of:
   (a) grouping said traffic flows into first and second groups utilizing said packet size parameter of said each traffic flow, said first group for single-cell packet traffic flows and said second group for variable-size packet traffic flows; and
   (b) sending internal cells associated with said first group to at least one designated reassembly queue of said reassembly queues, wherein said at least one designated reassembly queue is designated for said first group, and wherein said at least one designated reassembly queue is for reassembling said single-cell packets from said internal cells associated with said first group prior to transmission from said network element.

2. The method of claim 1, wherein said single-cell packet traffic flow is a limited-size packet flow having limited-size packets associated with a limited number of internal cells within said network element, said single-cell packets are limited-size packets, and a packet size parameter for said limited-size packet flow indicates said limited number.

3. The method of claim 1, wherein said at least one designated reassembly queue is selected by said network element prior to sending said internal cells from said traffic flows of said first group to said at least one designated reassembly queue.

4. The method of claim 3, wherein said at least one designated reassembly queue is one of a plurality of designated reassembly queues.

5. The method of claim 1, wherein said step (b) is performed by assigning internal cells associated with said first group to said at least one designated reassembly queue utilizing a reassembly queue assignment scheme.

6. The method of claim 5, wherein said reassembly queue assignment scheme performs said assigning on a round robin basis.

7. The method of claim 1, wherein each of said packets has at least one data part.

8. The method of claim 7, wherein said at least one data part is one fixed length internal cell and an upper bound for a packet size of said single-cell packets is a size of one said fixed length internal cell.

9. The method of claim 1, wherein said single-cell packets are reassembled as frames for transmission by said network element to an egress frame interface.

10. The method of claim 1, wherein said step (b) reuses said at least one designated reassembly queue to concentrate said single-cell packets into said at least one designated reassembly queue.

11. A queuing apparatus for allocating reassembly queues at an egress of a network element to traffic flows received at an ingress to said network element, each traffic flow having a respective packet size parameter for indicating whether said each traffic flow is a single-cell packet traffic flow having single-cell packets or a variable-size packet traffic flow having variable-size packets, each of said single-cell packers being associated with a single internal cell within said network element and each of said variable-size packets being associated with a variable number of internal cells within said network element said apparatus comprising:
   a classification module for grouping said traffic flows into first and second a groups utilizing said packet size parameter of said each traffic flow, group for single-cell packet traffic flows and said second group for variable-size packet traffic flows; and
   a transmission module for sending internal cells associated with said first group to at least one designated reassembly queue of said reassembly queues, wherein said at least one designated reassembly queue is designated for said first group, and wherein said at least one designated reassembly queue is for reassembing said single-cell packets from said internal cells associated with said first group prior to transmission from said network element.

12. The queuing apparatus of claim 11, wherein said single-cell packet traffic flow is a limited-size packet flow having limited-size packets associated with a limited number of internal cells within said network element, said single-cell packets are limited-size packets, and a packet size parameter for said limited-size packet flow indicates said limited number.

13. The queuing apparatus of claim 11, wherein said at least one designated reassembly queue is selected by said network element prior to sending said internal cells from said traffic flows of said first group to said at least one designated reassembly queue.

14. The queuing apparatus of claim 13, wherein said at least one designated reassembly queue is one of a plurality of designated reassembly queues.

15. The queuing apparatus of claim 11, wherein said queuing module assigns said internal cells associated with said first group to said at least one designated reassembly queue utilizing a reassembly queue assignment scheme.

16. The queuing apparatus of claim 15, wherein said reassembly queue assignment scheme assigns on a round robin basis.

17. The queuing apparatus of claim 11, wherein each of said packets has at least one data part.

18. The queuing apparatus of claim 17, wherein said at least one data part is one fixed length internal cell and an upper bound for a packet size of said single-cell packets is a size of one said fixed length internal cell.

19. The queuing apparatus of claim 11, wherein said single-cell packets are reassembled as frames for transmission by said network element to an egress frame interface.

20. The queuing apparatus of claim 11, wherein a number of said traffic flows belonging to said first group exceeds a number of said at least one designated reassembly queue.

* * * * *

UNITED STATES PATENT AND TRADEMARK OFFICE
CERTIFICATE OF CORRECTION

PATENT NO. : 7,254,112 B2 Page 1 of 1
APPLICATION NO. : 10/294630
DATED : August 7, 2007
INVENTOR(S) : Jerome Cornet et al.

It is certified that error appears in the above-identified patent and that said Letters Patent is hereby corrected as shown below:

1. Claim 5, column 12, line 60: Insert the word --said-- after the word "assigning".
2. Claim 11, column 13, line 22: Insert a comma after the word "element".
3. Claim 11, column 13, line 24: Delete the word "a" after the word "second".
4. Claim 11, column 13, line 25: Insert the words --said first-- before the word "group".

Signed and Sealed this

Sixth Day of November, 2007

JON W. DUDAS
*Director of the United States Patent and Trademark Office*